US009607138B1

(12) United States Patent
Baldwin et al.

(10) Patent No.: US 9,607,138 B1
(45) Date of Patent: *Mar. 28, 2017

(54) USER AUTHENTICATION AND VERIFICATION THROUGH VIDEO ANALYSIS

(71) Applicant: Amazon Technologies, Inc., Reno, NV (US)

(72) Inventors: Leo Benedict Baldwin, Seattle, WA (US); Nicholas Ryan Gilmour, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 487 days.

This patent is subject to a terminal disclaimer.

(21) Appl. No.: 14/132,885

(22) Filed: Dec. 18, 2013

(51) Int. Cl.
| | |
|---|---|
| G06F 21/00 | (2013.01) |
| G06F 21/32 | (2013.01) |
| G06F 21/62 | (2013.01) |
| H04W 12/06 | (2009.01) |
| H04L 29/06 | (2006.01) |
| H04W 12/00 | (2009.01) |
| G06F 21/30 | (2013.01) |

(52) U.S. Cl.
CPC .......... *G06F 21/32* (2013.01); *G06F 21/6218* (2013.01); *H04L 63/0861* (2013.01); *H04W 12/06* (2013.01); *G06F 21/30* (2013.01); *H04W 12/00* (2013.01)

(58) Field of Classification Search
CPC ............ H04L 63/08; H04L 63/10; H04L 9/32
USPC ............. 713/168, 182–186; 726/2–4, 16–21, 726/26–30
See application file for complete search history.

(56) References Cited

U.S. PATENT DOCUMENTS

| | | | | |
|---|---|---|---|---|
| 8,548,207 | B2* | 10/2013 | Langley ................ | G06F 21/32 382/115 |
| 8,970,348 | B1* | 3/2015 | Evans ..................... | G06K 9/00 340/5.52 |
| 9,230,158 | B1* | 1/2016 | Ramaswamy ..... | G06K 9/00281 |
| 2008/0170776 | A1* | 7/2008 | Albertson ............... | G06F 21/35 382/154 |

(Continued)

OTHER PUBLICATIONS

Choudhury, Tanzeem, et al. "Multimodal person recognition using unconstrained audio and video." Proceedings, International Conference on Audio-and Video-Based Person Authentication. 1999.*

*Primary Examiner* — Madhuri Herzog
(74) *Attorney, Agent, or Firm* — Seyfarth Shaw LLP; Ilan N. Barzilay; Christopher A. Baxter

(57) ABSTRACT

Approaches utilize image information to not only identify a user, but also verify that the user is actually a physical person and not a false representation of that user. For example, a computing device can utilize image information with a facial recognition process in order to verify an identity of a current user of the device. A fingerprint or other verification metric can be generated from the image information and can be used to verify that the user is actually a physical human user instead of a representation (e.g., photo) of a human user. The fingerprint can include a number of cues, such as a shape of the face, a stereo disparity signature of the face, facial feature movement, as well as a presence of a human pulse. The cues can be combined and utilized for authenticating a user into the device as well as for verifying that the user is actually a physical person and not a false representation of that user.

19 Claims, 9 Drawing Sheets

(56) References Cited

U.S. PATENT DOCUMENTS

| | | | | |
|---|---|---|---|---|
| 2008/0304716 A1* | 12/2008 | Hirose | ............... | G06K 9/00201 |
| | | | | 382/118 |
| 2011/0299741 A1* | 12/2011 | Zhang | ................ | G06K 9/00906 |
| | | | | 382/117 |
| 2014/0341440 A1* | 11/2014 | Walch | ..................... | G06F 21/40 |
| | | | | 382/116 |

* cited by examiner

USER AUTHENTICATION AND VERIFICATION THROUGH VIDEO ANALYSIS

BACKGROUND

Users are increasingly utilizing electronic devices for a wide variety of tasks. Many of these tasks relate to confidential or sensitive information that a user might want to protect from unauthorized access. While conventional approaches such as passwords provide some level of security, passwords can be obtained in a number of different ways that enable others to pose as a user and gain access to the user information. Accordingly, users are increasingly turning to other security mechanisms, such as may be based on biometrics, that attempt to identify or authenticate a person attempting to gain access to user information. It is still possible in many situations, however, to defeat or "spoof" a biometric security feature to gain unauthorized access. For example, a device might capture an image to attempt to perform facial recognition on the person attempting to gain access, where access is only provided upon identifying features known to correspond to an authorized user. If another person holds up a photo of the authorized user, however, the two-dimensional image captured by the camera can be indistinguishable from a similar image captured of the actual user, such that the person can gain access by using the photo to fool the authentication algorithm.

BRIEF DESCRIPTION OF THE DRAWINGS

Various embodiments in accordance with the present disclosure will be described with reference to the drawings, in which.

DETAILED DESCRIPTION

Figure 1A:
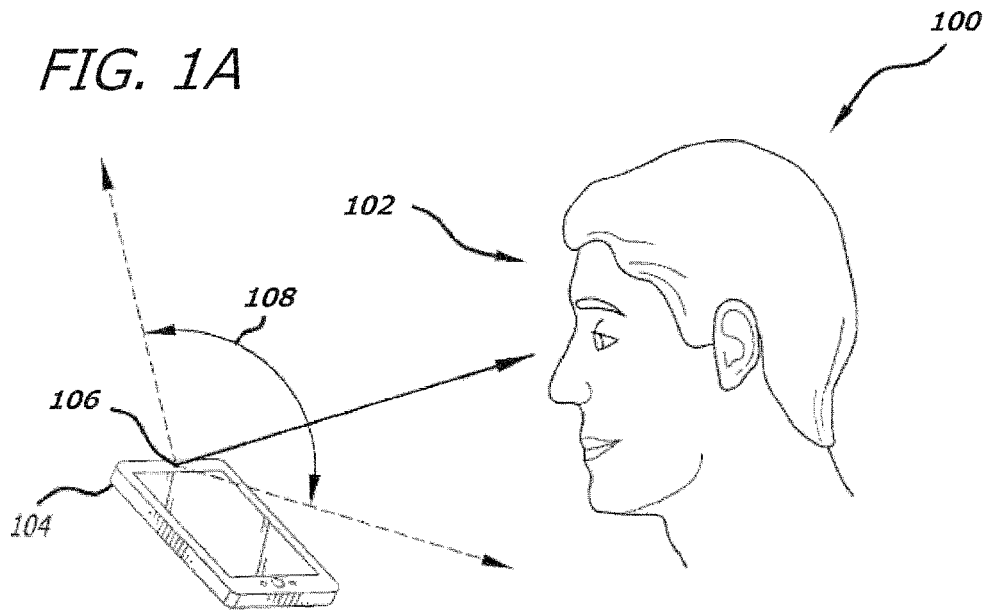
FIGS. 1A and 1B illustrates an example situation wherein a computing device is capturing image information including at least a portion of a user of the device in accordance with various embodiments.

Systems and methods in accordance with various embodiments of the present disclosure may overcome one or more of the aforementioned and other deficiencies experienced in conventional approaches to identifying and/or authenticating a user of a computing device. In particular, various embodiments utilize image information to not only identify a user, but also verify that the user is actually a physical person and not a false representation of that user. For example, a computing device can acquire image information (one or more images or video) to use with a facial recognition process, in order to attempt to verify an identity of a current user of the device. A fingerprint, verification signature, or other verification metric can be generated from the image information and can be used to verify that the user is actually a physical person. The fingerprint can include a number of cues determined from the image information, such as a shape of the face, a stereo disparity signature of the face, color or image brightness, facial feature (e.g., mouth, eyes, head, etc.) movement, among others. In certain embodiments, the computing device also can capture and analyze video (i.e., a set of images) over a period of time sufficient to encompass one or more cycles of a human pulse or heartbeat. Thereafter, at least a subset of the cues can be combined and used for detecting faces within image or video information and verifying that the user is actually a physical person, e.g., a physical person being within a detectable range of the computing device, and not a false representation of that user.

In certain embodiments, determining the human pulse or heartbeat can include determining the location of the user's head in the captured video can be determined, and color values of a portion of the video corresponding to the head can be analyzed for variations corresponding to the fluctuations in a human face for a human pulse. For example, the red values of a human face can vary with the pulse cycles as the amount of blood flow varies. While this variation may be too subtle to be noticed by the human eye, a video camera of a computing device can be sensitive enough to detect the variations. These variations then can be used to verify that captured image information reflects an actual person, and not a generated or obtained image of a person. Other fluctuations in the video information can be determined as well, such as the blinking of a user's eyes, rotation of the user's head, and other such information.

In various other embodiments, determining a stereo disparity signature can include using two or more stereoscopically configured cameras to provide depth and/or distance information (in the form of stereo disparity). The stereo disparities of various features of a face are significantly different from that of non-faces and/or backgrounds. This stereo disparity reveals a signature in the location of the eyes, nose, mouth and face contour/edge. For example, when viewed with a sufficiently close distance, the stereo disparity of a nose will be greater than the areas around it (i.e., because the nose is slightly closer to the cameras). Similarly, the stereo disparity of each eye will be less than the eyebrows above it since the eyes generally tend to be slightly sunken in (i.e., further away from the camera). The stereo disparity of these and other such features of the face can be used to compute a stereo disparity signature that can be used as a cue in verifying that the user is actually a physical person and not a false representation of that user. It should be noted that although various examples described throughout this disclosure refer to a "face", any other object or feature of the user may be detected by utilizing the techniques herein. For example, a user's entire head, hand or finger may be detected using the embodiments described herein.

In certain embodiments, based at least in part on the cues used in the set of cues, the user can be provided access to at least a portion of the functionality and/or granted a level of access. For example, at least one of the one or more of the cues (e.g., disparity signature, a determination of a human pulse) can be compared to a model associated with an authorized user of the device to generate a confidence value (or other score) indicative of whether the current user operating the device is likely the owner of the device. The confidence value can be compared to at least one confidence threshold, for example, and based on the comparison, the current user can be provided access to at least a portion of functionality of the device and/or a security action (such as disabling the device, sending an email to the owner of the device, calling another phone number, requiring the current user to enter a passcode, among others) can be performed when the confidence value does not at least meet at least one confidence threshold. In at least some embodiments, the type of access granted and/or security action performed can correspond to the determined confidence value and/or the confidence thresholds that were, or were not, met. For example, a confidence value meeting a highest threshold might be granted full access with no security action taken, while a confidence value meeting a lower threshold might have some access granted with a type of security action taken, while a confidence value not meeting any of these thresholds might result in a user being locked out of a device or another such action taken.

Many other alternatives and variations are described and suggested below in relation to at least some of the various embodiments.

FIG. 1A illustrates an example situation 100 wherein a person 102 is attempting to gain access to a computing device 104. The computing device 104 in this example includes at least one image capture element 106 that is operable to capture image information over a range of angles 108, or field of view, with respect to the device. Although a portable computing device (e.g., a cell phone, an electronic book reader, or tablet computer) is shown, it should be understood that any electronic device capable of receiving and processing input, or at least capable of rendering and/or displaying visual content, can be used in accordance with various embodiments discussed herein. Example devices can also include, for example, desktop computers, notebook computers, personal data assistants, smart phones, video gaming consoles, television set top boxes, wearable computers (e.g., smart glasses, smart watches, etc.), and portable media players.

The camera 106 in this example is positioned on the device such that the person 102 likely will be at least partially included in the field of view 108 when the person is interacting with the device, such as by looking and/or interacting with a display screen of the device. It should be understood, however, that there can be additional and/or alternative cameras placed in similar or alternative locations in accordance with various embodiments, and that information from any or all of these cameras can be analyzed as appropriate. For example, a computing device might have a high resolution still camera that is able to capture images useful for performing facial recognition, and might have a lower resolution video camera that can be useful for performing pulse detection. In other embodiments, a single camera might be used to capture image information for both types of analysis, while still other embodiments might utilize stereo cameras or other elements to determine distance information or perform three dimensional modeling, among other such aspects. As mentioned, some devices might have digital still cameras that are able to capture single images at specific points in time, or digital video cameras that are able to continuously capture image information, which can be referred to as a set of frames in at least some embodiments. In some embodiments, a series of still images can be captured over a period of time and analyzed for purposes of color variation and pulse detection instead of video information. Also, for a process such as image recognition to be relatively accurate, the mage being analyzed may have to meet some minimum criteria. This can include, for example, adequate lighting and contrast, but can also include factors such as quality of focus and spatial resolution. Accordingly, a device can include additional elements as well, such as illumination elements and focusing optics as discussed elsewhere herein.

As described, a user might want to protect confidential or secure information from unauthorized access. While conventional approaches such as passwords provide some level of security, passwords can be obtained in a number of different ways that enable others to pose as a user and gain access to the user information. Accordingly, users are increasingly turning to other security mechanisms, such as may be based on biometrics, that attempt to identify or authenticate a person attempting to gain access to user information. It is still possible in many situations, however, to defeat or "spoof" a biometric security feature to gain unauthorized access. For example, a device might capture an image to attempt to perform facial recognition on the person attempting to gain access, where access is only provided upon identifying features known to correspond to an authorized user. If another person holds up a photo of the authorized user, however, the two-dimensional image captured by the camera can be indistinguishable from a similar image captured of the actual user, such that the person can gain access by using the photo to fool the authentication algorithm.

Figure 1B:
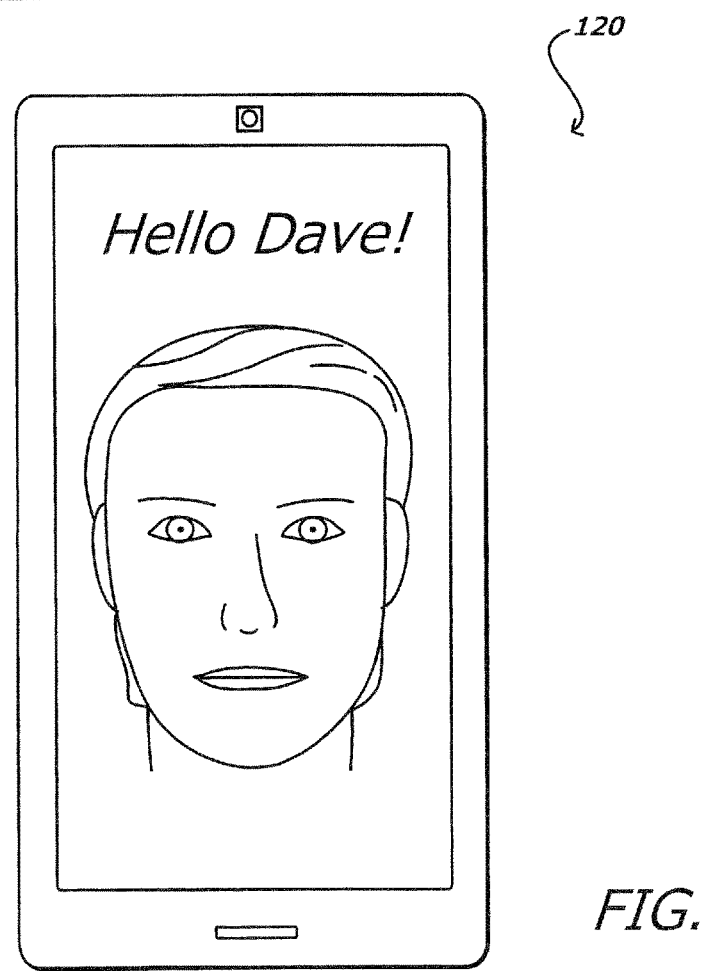

Accordingly, in accordance with various embodiments, approaches discussed herein enable a computing device, such as a phone or tablet computer, to utilize a number of cues to detect and verify the presence of a user in an image (or video) captured by a camera of the computing device. A fingerprint, signature, or other verification metric can be generated from the video information and can be used to verify that the user is actually a physical person. Thereafter, at least a subset of the cues can be combined to be used for detecting faces within image or video information and verifying that the user is actually a physical person and not a false representation of that user. Based at least in part upon identifying the user and at least one cue (e.g., disparity signature, detected pulse) meeting a threshold, the user can be granted at least one level of functionality or access to the computing device. For example, as shown in example situation 120 of FIG. 1B, the device has identified the user and based at least in part on at least one additional biometric verification being satisfied, the user has been authenticated to access at least some functions of the device.

Figure 2A:
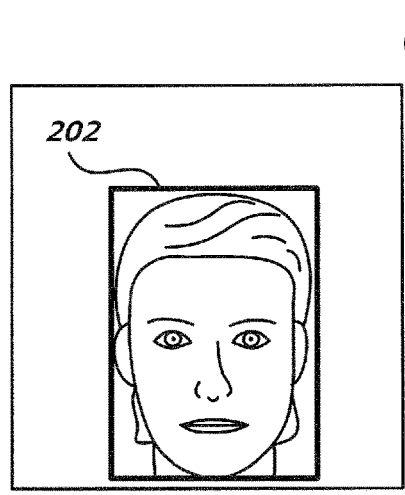
FIGS. 2A, 2B, 2C, and 2D illustrate an example of a head location and feature locations that can be determined from a captured image that can be used as a cue for face detection and recognition in accordance with various embodiments.

As mentioned, it can be desirable in various situations to capture one or more images or frames of video for using in authenticating an identity of a person attempting to access information and/or functionality through the computing device. FIGS. 2A-2D illustrates using the shape of a face as a cue with face detection, in accordance with various embodiments. Such approach can be used to analyze features of the various images to attempt to identify features that can accurately predict or identify corresponding features of faces in other images. As mentioned, in at least some embodiments these features can include shape cues and/or disparity cues, among others discussed herein. As illustrated in FIG. 2A, at least some embodiments utilizes a face or head detection algorithm as discussed above to attempt to locate an approximate head or face position 202 in a captured image or video frame 200. In some embodiments, a computing device might utilize one or more motion sensors, such as an electronic gyroscope or inertial sensor, to attempt to assist with location determinations. For example, a rotation of a device can cause a rapid shift in objects represented in an image, such that image stabilization might not be attempted if the amount of motion exceeds a determined amount. For smaller movements, the information from the motion sensors can be used to provide a starting point for the feature detection in a subsequent image, which can increase the speed of the detection process and reduce the amount of processing and power required. Various other types of movement or motion information can be used as well within the scope of the various embodiments.

Figure 2B:
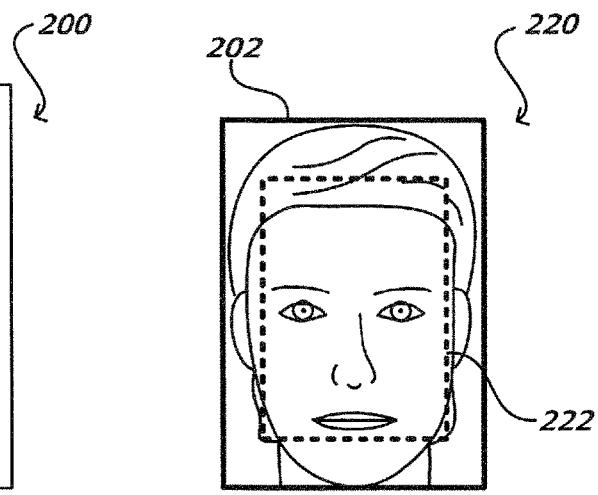

Once the facial region to be analyzed is determined, and tracked or updated over time in the video information, one or more head or face detection algorithms can be used to identify features of the user's face. For example, FIG. 2B illustrates an example situation 220 where a head or face detection algorithm has been used to attempt to locate a portion of the image 222 that corresponds to the approximate facial features of the user's face. The head or face detection algorithm can include any appropriate algorithm known or used for such purposes, such as a template matching algorithm, a neural network algorithm, a Fisher linear discriminant algorithm, a maximal rejection classifier algorithm, a support vector machine algorithm, an edge filtering algorithm, an edge detection algorithm, and the like. The ability to locate the head position in an image can reduce the amount of resources otherwise needed to perform facial recognition, as the analysis can be performed only on the portion of the image corresponding to the head position. Further, in some embodiments facial recognition might not be performed unless a head or face can first be detected in the captured image.

Figure 2C:
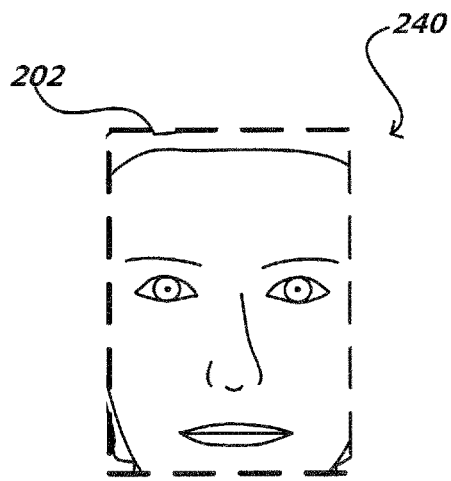
Figure 2D:
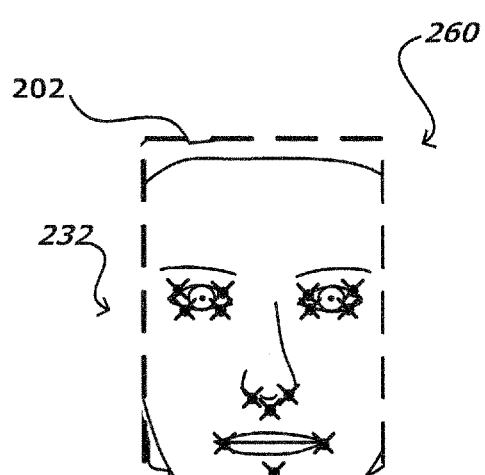

In this example, the detected head portion, as shown in example 240 of FIG. 2C, can be analyzed using one or more facial recognition algorithms to attempt to identify facial features of the person represented in the image. As illustrated in example 260 of FIG. 2D, this can include identifying unique or distinguishing points 232, facial marks, geometric shapes or distances, or other such features on the face. Example facial recognition algorithms can include, for example, a linear discriminate analysis algorithm, a Fisherface algorithm, a Hidden Markov model-based algorithm, a principal component analysis algorithm, and a neuronal motivated dynamic link matching algorithm, among others. The image should be of sufficient resolution, clarity, and focus, for example, enabling the algorithms to adequately match the image to information stored for the user. As known, a facial recognition algorithm can take an amount of time to analyze an image, such that other processes can be executed during the analysis. If should be noted that various other processes to detect a user or a portion of a user (e.g., head, face, hands) in image data can be used. Such approaches can include, for example, using template matching to determine whether a user is represented in an image. Template matching is based on matching a pre-defined face pattern or parameterized function to locate the user within an image. Templates are typically prepared manually "offline." In template matching, correlation values for the head and facial features are obtained by comparing one or more templates to an input image, and the presence of a face is determined from the correlation values. Another such approach includes using classifiers that are trained from positive examples of persons represented in images and negative examples of images with no persons. Application of the classifiers to an input image can determine whether a user exists in an image.

In accordance with various embodiments, these approaches can be used to identify the user of the device. However, as described, various embodiments utilize image information to not only identify a user, but also verify that the user is actually a physical person and not a false representation of that user. One such approach involves capturing video information and/or a series of images over a period of time sufficient to determine movement of a user's face and/or movement of various facial features of the user. For example, after at least a portion of a user has been detected in image data captured by a computing device, approaches in accordance with various embodiments track the detected portion of the user, and the detected movement can be used to at least verify that the user is actually a physical person and not a false representation of the user, such as an image representing the user. FIGS. 3A-F illustrate certain approaches that can be utilized for detecting and tracking a user to verify that the face represented in the image(s) undergoing the recognition process corresponds to an actual human face, and not a representation of a human face.

Figure 3A:
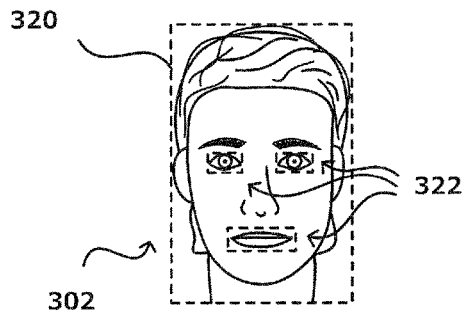
FIGS. 3A-3F illustrate examples of tracking a user where such tracking can be used as a cue in performing face detection and recognition in accordance various embodiments.

FIG. 3A illustrates an example wherein the approximate position and orientation of the head of a user 302 has been determined and a virtual "box" 320 is placed around the user's head using one or more of the various user detection processes discussed herein. A similar or different approach can also be used to determine an approximate location and area 322 of each of the user's eyes (or in some cases the eyes in tandem) and mouth or other facial features. By determining the location of the user's eyes and mouth as part of facial detection, advantages may be obtained as it can be more likely that the image determined to be the user's face actually includes the user's face, and it can be determined that the user is in front of the device. Further, the relative movement of the user's eyes and mouth can be easier to detect than the overall movement of the user's face when the user is performing motions such as nodding or shaking the head back and forth. Further still, the relative movement of the user's eyes and mouth can be used to verify that the face represented in the image(s) undergoing the recognition process corresponds to an actual human face, and not a representation of a human face. As described, movement of the user's eyes and mouth can be determined by capturing video information and/or a series of images over a period of time sufficient to determine movement of such facial features of the user.

Figure 3B:
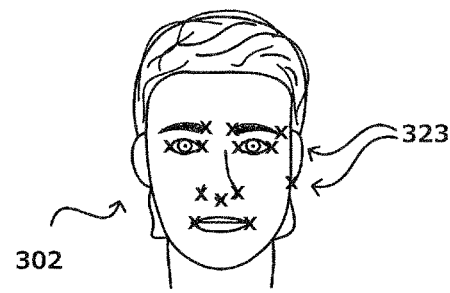

Various other approaches can also be used to verify that the face represented in the image(s) undergoing the recognition process corresponds to an actual human face, and not a representation of a human face. For example, FIG. 3B illustrates an example wherein various features on a user's face are identified and assigned a point 324 in the image. The system thus can detect various aspects of user facial features and can determine changes such as movement or change in shape or expression. Such an approach can provide advantages over the general approach of FIG. 3A in certain situations, as various points along a facial feature can be determined, such as the end points and at least one center point of a user's mouth. Accordingly, expressions such as a smile or frown can be captured even though the overall position of the user's mouth or face did not move and the expressions can be used to verify that the face represented in the image(s) undergoing the recognition process corresponds to an actual human face, and not a representation of a human face. For example, once the facial features of a user are detected, relative motion or changes in facial expression can be tracked and utilized as input to verify that the face represented in the image(s) undergoing the recognition process corresponds to an actual human face, and not a representation of a human face.

Figure 3C:
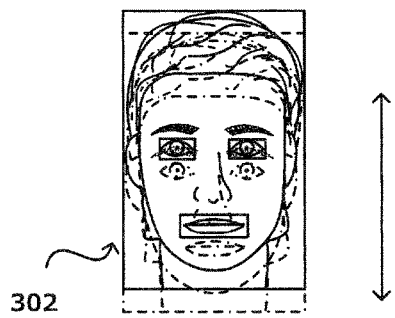
Figure 3D:
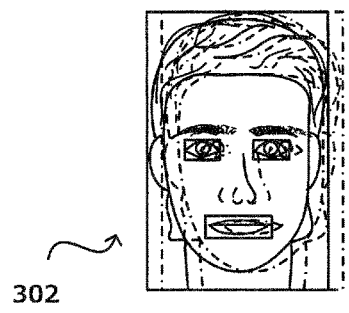
Figure 3E:
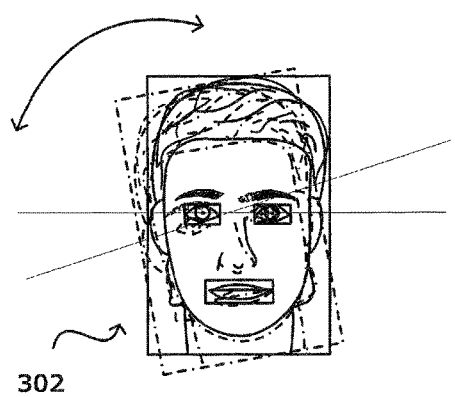

For example, FIG. 3C illustrates an example where the user's head 302 is moving up and down with respect to the viewable area of the imaging element. As discussed, this could be the result of the user shaking his or her head, or the user moving the device up and down, etc. FIG. 3D illustrates a similar example wherein the user is moving right to left relative to the device, through movement of the user, the device, or both. As can be seen, each movement can be tracked as a vertical or horizontal movement, respectively, and each can be treated differently as an input to perform a specified function, such as to verify that the face represented in the image(s) undergoing the recognition process corresponds to an actual human face, and not a representation of a human face. As should be understood, various embodiments also can detect diagonal or other such movements. FIG. 3E further illustrates an example wherein the user tilts the device and/or the user's head, and the relative change in eye position is detected as a rotation. In some systems, a "line" that corresponds to the relative position of the eyes (or other facial features such as eyebrows, hairline, mouth, chin, ears, etc) can be monitored, and a shift in angle of this line can be compared to an angle threshold to determine when the rotation should be interpreted as input.

Figure 3F:

FIG. 3F illustrates another advantage of using an approach such as that described with respect to FIG. 3B to determine the position of various features on a user's face. In this example, it can be seen that the features of a head of a second user 303 have a different relative position and separation. Thus, a computing device also can not only determine positions and changes of facial features for a specific user, but can distinguish between different users. Also, the device can be configured to detect how close a user is to the device based on, for example, the amount and ratio of separation of various features, such that the device can detect movement towards, and away from, the device. This can help to improve the accuracy of facial tracking and/or in verifying that the face represented in the image(s) undergoing the recognition process corresponds to an actual human face, and not a representation of a human face.

Figures 4A, 4B:
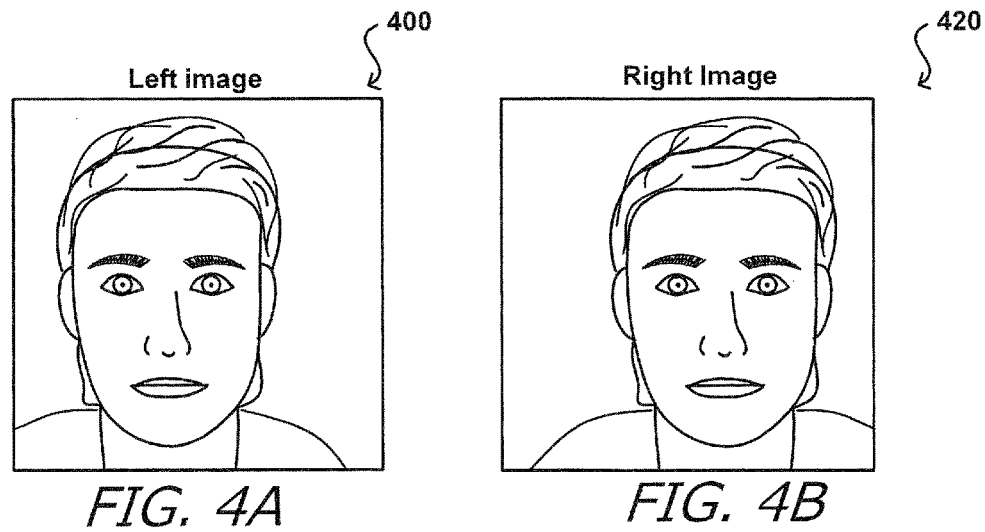
FIGS. 4A, 4B, and 4C illustrate stereoscopic image data that can be captured in accordance with various embodiments.
Figure 4C:
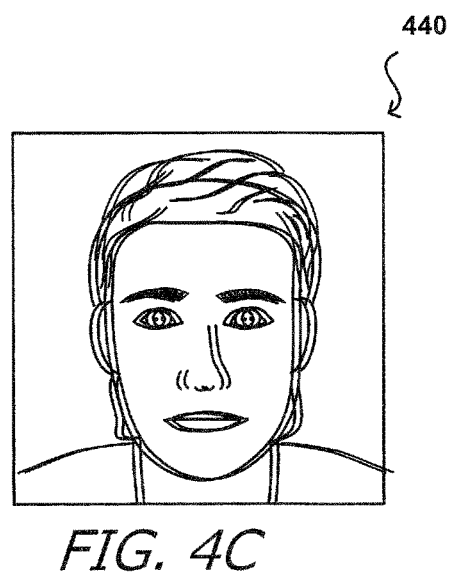

As mentioned, systems and methods in accordance with various embodiments can attempt to verify that the face represented in the image(s) undergoing the recognition process corresponds to an actual human face, and not a representation of a human face, based at least in part on disparity information determined from a stereo pair of images captures from a pair of stereo cameras. Another such approach includes determining a stereo disparity signature using two or more stereoscopically configured cameras to provide depth and/or distance information (in the form of stereo disparity). The stereo disparity of various features of a face can be used to compute a stereo disparity signature that can be used as a cue in verifying that the user is actually a physical person and not a false representation of that user. For example, a device might utilize stereo cameras or a distance sensor, or other such element(s) to attempt to detect distance information or disparity information as well, which can be used to generate at least a basic three-dimensional model of the determined facial region. The three-dimensional (3D) data can be used to verify that the region corresponds generally to the shape of a human head, and not a flat screen or image. For example, FIGS. 4A and 4B illustrate images 400, 420 that could be captured using a pair of front-facing stereo cameras embedded in a computing device for use in determining stereo disparity. In various embodiments, the pair of front-facing cameras may capture the images simultaneously or substantially simultaneously and therefore would include matching points of interest in their respective images. For example, the user's finger, nose, eyes, eyebrows, lips or other feature points may be identified by the computing device in both images by using any one of the feature detection algorithms mentioned above. FIG. 4C illustrates an example combination image 440 showing the relative position of various objects in the captured images 400, 420. As illustrated, objects closest to the camera, such as the user's hand, have the greatest amount of disparity, or horizontal offset between images. Objects farther away from the device, such as a background object or an object behind the person, have very small amounts of disparity. Objects between these two areas will have intermediate amounts of disparity based upon the relative distance of those objects from the cameras. It should be understood that words such as "horizontal" are used for purposes of simplicity of explanation and should not be interpreted to require a specific orientation unless otherwise stated, as devices can be used in any orientation and cameras or sensors can be placed at various locations on a device as appropriate.

Figure 5:
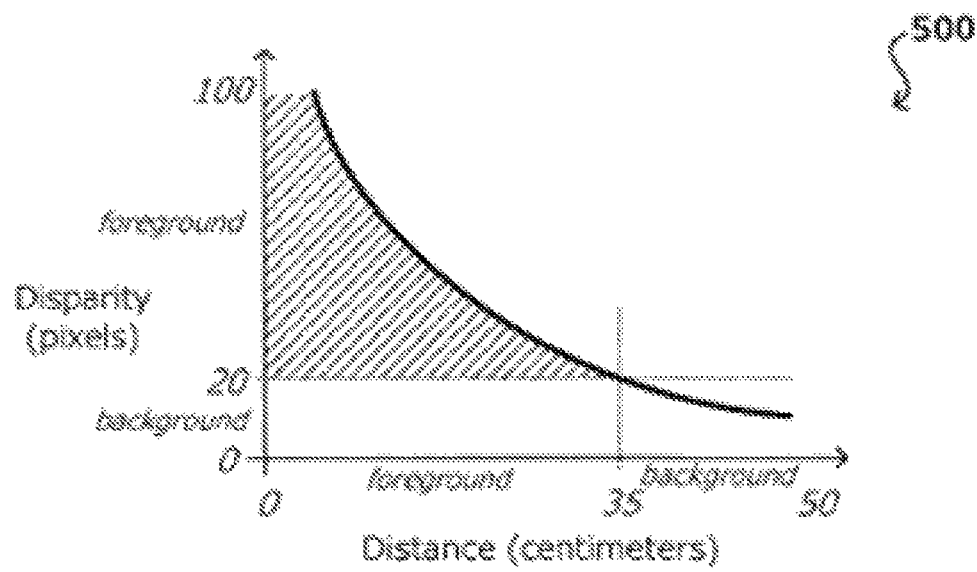
FIG. 5 illustrates an example plot showing a relationship of disparity with distance in accordance with various embodiments.

FIG. 5 illustrates an example plot 500 showing a relationship of disparity with distance. As illustrated, the amount of disparity is inversely proportional to the distance from the cameras, such that there can be significantly more levels of disparity in the near camera field (e.g., 0-1 m) than in the far field (e.g., 1 m-infinity). Further, the decrease is not linear but decreases more quickly near the device than at a distance, as objects in the distance can have little to no disparity regardless of whether they are twenty feet away or a mile away. An approach in accordance with various embodiments can determine the distance between a user's feature and the camera based on the amount of stereo disparity between the two images captured by the pair of front-facing cameras. For example, a user's face looking at a smart phone might typically be located within 50 centimeters from the device. By examining the disparity relationship curve 500 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, etc.) in the stereo images, and estimate the distance between those feature points and the computing device. For example, the amount of disparity, D, at a given distance, d, can be represented by the relationship:

$$D = \frac{f \times B}{d}$$

where f is the focal length of each of the matched cameras and B is the baseline, or distance between the viewpoints of the cameras based at least in part upon their relative positions and separation. In this example, if the focal length of a VGA camera is four hundred pixels and the baseline is five centimeters, for a distance of one meter the disparity would be twenty pixels. Based on relationships such as this one, the computing device may be able to determine the distance between the user's feature points and the camera.

Figure 6:
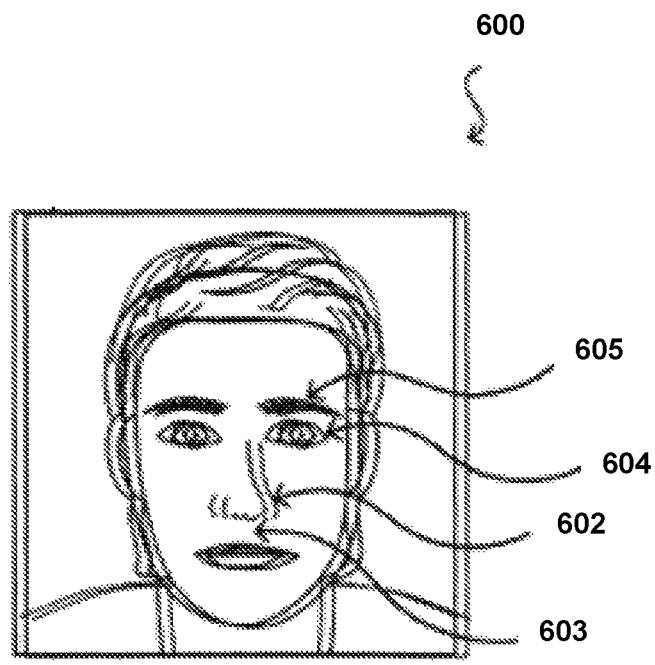
FIG. 6 illustrates an example of using stereo disparity information as a cue for performing face detection and recognition in accordance with various embodiments.

FIG. 6 illustrates an example 600 of using stereo disparity information as a cue for verify that the user is actually a physical person and not a false representation of that user in accordance with various embodiments. As previously described, the stereo disparities of various features of a face are significantly different from that of non-faces and/or backgrounds, and this information can be used to generate a signature in the location of the eyes, nose, mouth and face contour/edge that can be used to verify that the face represented in the image(s) undergoing the recognition process corresponds to an actual human face, and not a representation of a human face. In some embodiments, these example images each contain a corresponding stereo disparity image (i.e., image captured by another camera that has been configured for stereoscopic imaging, as previously described with reference to FIGS. 4-5. The image and the stereo disparity image both contain a representation of the same object, such as a face, but with a slight offset on the axis along which the cameras are aligned that is caused by the distance between the two cameras. This offset (i.e., stereo disparity) becomes smaller and smaller as the object gets farther and farther away from the camera, such that at far distances, the stereo disparity becomes almost 0. At close distances to the camera, however, the stereo disparity can be measured and is representative of depth and/or distance information of each object or feature in the images. The stereo disparity of these and other such features of the face can be used to compute a stereo disparity signature that can be used as a cue in verifying that the user is actually a physical person and not a false representation of that user.

For example, image intensity cues can be combined with stereo disparity cues to enable a more robust face detection. This can be performed by generating a stereo disparity signature of a face based on the combination of stereo disparities of various features of the face. For example, in general, the stereo disparity of the nose 602 of a face will be slightly greater than the stereo disparity of the areas around the nose 603 because the nose is slightly closer to the camera than other areas of the face. Similarly, the stereo disparity of the eye 604 is generally smaller than the stereo disparity of the eyebrow 605 or other areas around the eyes because the eyes tend to be slightly sunken in and thus farther away from the camera. Based on these differences in disparity, a stereo disparity signature of a face can be determined and used as a cue to aid with face detection. In some embodiments, the stereo disparity cues can be combined with conventional face detection models, such as the Viola-Jones framework.

In one embodiment, the face and stereo disparity cues can be combined in the following manner. First, a portion of each image containing the face is extracted from the image. Similarly, a corresponding portion of the stereo image containing the face can also be extracted. Extracting the image may simply be performed by determining the portion of the image. Alternatively, the image may be cropped or otherwise analyzed to extract the portion containing the face.

Once the portions of the images containing faces have been extracted, the portion of the image containing the face can be normalized. Normalizing involves adjusting values of pixels to a common scale, as different images might use different contrast and brightness settings, color scales, etc. In at least some embodiments, this can involve determining the mean pixel value for each image, and then subtracting the mean pixel value from the value of each pixel in the respective image. In this way, each image has its mean pixel value adjusted to 0. The standard deviation of each image can be determined, and then the pixel values of each image can be divided by the standard deviation as well, such that the values of each image are on a common scale as well. In various embodiments, the same operation may be performed on the corresponding stereo disparity image. Various other approaches to parametric normalization can be used as well within the scope of the various embodiments.

Once the image portions have been normalized, the normalized portion can be converted into a vector that numerically represents the portion of the image. Converting may be performed by raster scanning the rows of each portion and rearranging the rows as a single long vector. The same operation can also be performed on the corresponding portion of the stereo disparity image to produce a corresponding vector. The image and pixel cues can then be utilized by combining the vector representing the portion of the image with the vector representing the corresponding portion of the stereo image (i.e., "stacking" the normalized image and stereo disparity vectors on top of each other). This form of cue combination is can provide improvements in distinguishing faces from backgrounds over using solely image information without the stereo disparity cues.

In various other embodiments, other cues may also be used in addition to (or instead of) the stereo disparity and the shape cues described above. For example, color (when available) is another cue that can be used to assist with face detection. Color histograms in general are representative of image color. A histogram can indicate the number of observations that fall into each of a number of disjoint categories or "bins." The appropriate bins to use in at least some embodiments can be determined during the training phase discussed above, wherein appropriate color ranges or values can be selected that are indicative of faces or other such features. Different numbers of bins can be appropriate for different training sets, and different bin sizes can reveal different features of the data. In addition to color, intensity histograms are a distinctive way of separating an object in an image from the background in the image. Both color and intensity histograms can be made stronger by computing them in different image sub-regions and then accumulating all histograms into one. These cues can be combined with other cues using the normalization procedure described above.

Figure 7A:
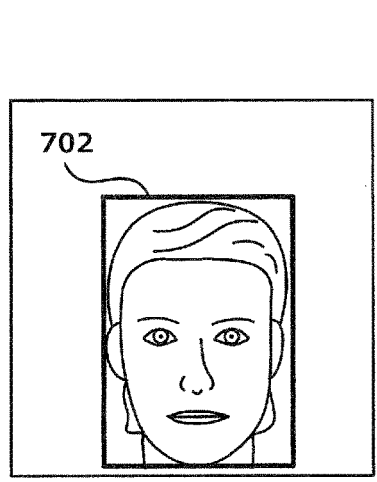
FIGS. 7A-7D illustrate stages of an image being analyzed to detect changes in chroma values in accordance with one embodiment.
Figure 7B:
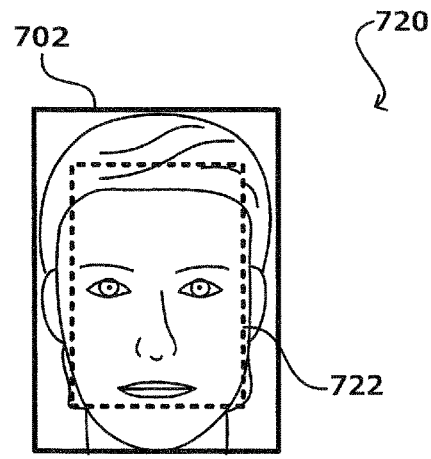

In various embodiments, a human pulse or heartbeat can be used in addition to (or instead of) the stereo disparity and the shape cues described above. Determining the human pulse or heartbeat can include capturing video information and/or a series of images over a period of time sufficient to determine one or more cycles of a human pulse. In at least some embodiments, the video or image capture can occur during the performance of the facial recognition process on an initial image or video frame, etc. As illustrated in FIG. 7A, at least some embodiments also utilize a face or head detection algorithm as discussed above to attempt to locate an approximate head or face position 702 in a captured image or video frame 700. In approaches that attempt to detect color variations in the person's face, it can improve results in at least some embodiments to sufficiently isolate the person's face, such that variations in the background of the image do not create false positives (or false negatives in some instances). As illustrated in the isolated image portion 720 of FIG. 7B, in some embodiments an algorithm can analyze only a central portion or region 722 of the determined head position 702, in order to attempt to include primarily facial area and not hair or areas just outside the face region due to differences between the actual shape of the user's face and the shape of the bounding box 702 or other such boundary.

Figure 7C:
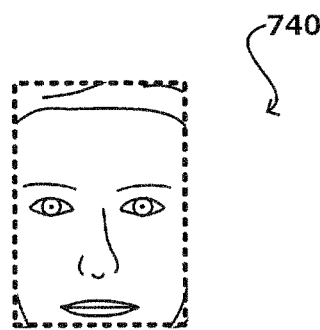
Figure 7D:
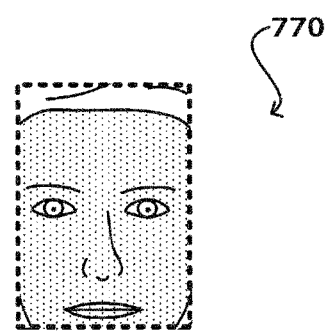

Once the facial region to be analyzed is determined, and tracked or updated over time in the video information, one or more color analysis algorithms can attempt to detect certain variations in that region over time. For example, the image portions 740, 760 of FIGS. 7C and 7D, respectively, show (with an exaggerated difference) that there can be variations in the color of a person's face over time, due to changes in blood flow corresponding to the human pulse, which can be detected by a camera of the computing device. In this particular example, the changes will primarily be detected in a red channel, such as in the chroma (color purity), intensity, or saturation of red colors in the image portions. It should be understood, however, that variations can similarly be detected in other color channels or portion as well. For example, as blood is pushed through the human face as a result of a pulse or heartbeat, the face will appear slightly redder. During other periods, the face will appear somewhat less red. By monitoring for changes in color corresponding in time to a period of a human pulse, and in amount of variance to that of human skin, a determination can be made as to whether the face in the image likely corresponds to an actual user and not a photograph or other such representation.

Figure 8:
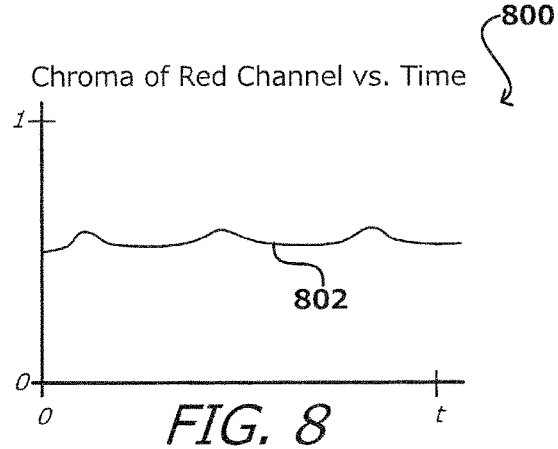
FIG. 8 illustrates an example plot of intensity values over time for a red chroma channel that can be generated in accordance with various embodiments.

FIG. 8 illustrates an example plot 800 of the chroma value for a red channel of an image over time. In this example, the facial region of the image can be determined and the colors separated into appropriate channels or components (e.g., red, blue, and green). The red values can be analyzed over time, and factors such as the chroma (or intensity, saturation, or other such measure) analyzed to determine whether the values 802 vary in time corresponding to the period of a human pulse, and vary in value or amplitude within a range appropriate for human skin. In the example plot, the red values vary periodically at a rate within the range of a human pulse, and with an appropriate amount of change, such that the device can determine that the face being imaged is likely an actual human face. "Chroma" as used herein refers to the perceived "strength" of a color and is well understood in the art to represent a degree of visual difference from a neutral gray of the same brightness, or the amount of color of an image relative to the brightness of an image of a white object similarly illuminated. In a preferred embodiment, the red color signal, or the difference between the red and blue color signals (R−B) is divided by the sum of the color signals (R+G+B) which may also be available as the luminance signal (brightness independent of chroma). In this way, a color signal (R−B)/L is sensitive to the variations in chroma due to the pulse but insensitive to variations in overall illumination. This in known in the art as normalization.

Figure 9:
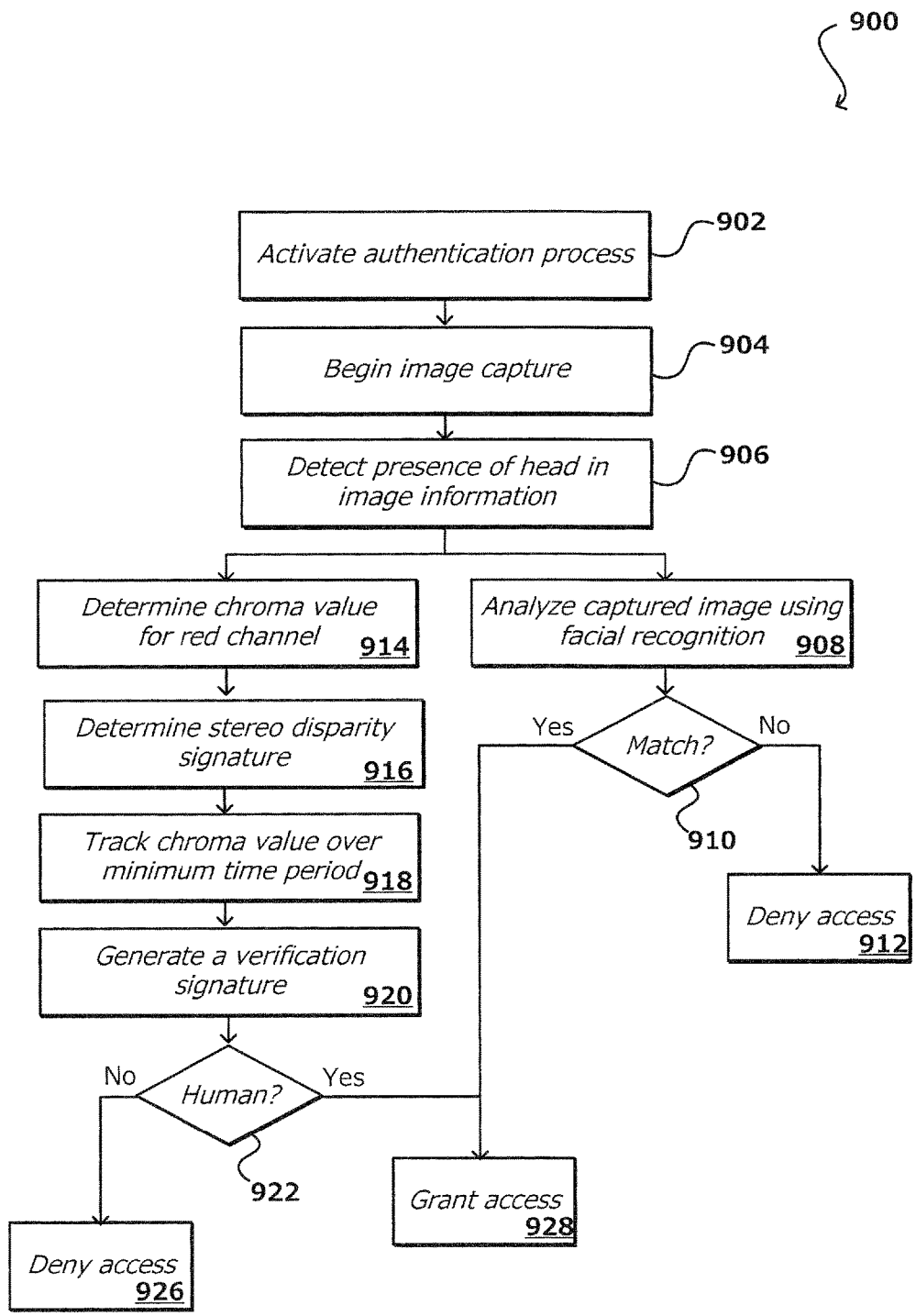
FIG. 9 illustrates an example process for authenticating a user using image information that can be used in accordance with various embodiments.

FIG. 9 illustrates an example process 900 for authenticating a user and verifying that the user is actually a physical person and not a false representation of that user through such techniques, which can be used in accordance with various embodiments. It should be understood, however, that there can be additional, fewer, or alternative steps performed in similar or alternative orders, or in parallel, within the scope of the various embodiments unless otherwise stated. In this example, an authentication process is activated 902 on the computing device. The authentication process can be activated in response to any appropriate event, such as a person attempting to access certain data or functionality on the device, a person coming within a field of view of at least one camera of the device, an activation of the device, or another such occurrence. If not already active, the device can begin image capture 904 using at least one camera having a person's face at least partially contained within a field of view of the camera. In various embodiments, a pair of stereo cameras can be used to capture a pair or series of stereoscopic images. In this example, the image information will be analyzed to attempt to detect 906 the presence of a human head or face in the image information.

Once a human head or face is detected, the captured image information can be analyzed 908 using facial recognition to attempt to authenticate an identity of the user. In some embodiments, this can include capturing a single, relatively high resolution image for use in the recognition process, which might be captured separately from the other image capture. In other embodiments, this can include analyzing a frame or image from the ongoing image capture. Other approaches to obtaining an image for analysis can be used as well. As a result of the image recognition process, it will be determined whether there was a match 910 within at least a minimum level of confidence or other such measure. If not, then the person will not be able to be authenticated and will be denied access 912.

During the facial recognition analysis in this example, a fingerprint, verification signature, or other verification metric can be generated from the image information and can be used to verify that the user is actually a physical person. The verification signature can include a number of cues determined from the video information, such as a shape of the face, a stereo disparity signature of the face, color or image brightness, facial feature (e.g., mouth, eyes, head, ect.) movement, among others. In one example, the aroma value for a red channel can be determined 914 for the head or face position in the captured image information. As discussed, this might be a central region of the determined head position, or other such portion of the image information, which can include video or a series of still images. In addition to the chroma value, a stereo disparity signature can be determined 916. The stereo disparity signature can include using two or more stereoscopically configured cameras to provide depth and/or distance information (in the form of stereo disparity). This stereo disparity can reveal a signature in the location of the eyes, nose, mouth and face contour/edge. For example, when viewed with a sufficiently close distance, the stereo disparity of a nose will be greater than the areas around it (i.e., because the nose is slightly closer to the cameras). Similarly, the stereo disparity of each eye will be less than the eyebrows above it since the eyes generally tend to be slightly sunken in (i.e., further away from the camera). The stereo disparity of these and other such features of the face can be used to compute a stereo disparity signature that can be used as a cue in verifying that the user is actually a physical person and not a false representation of that user.

The chroma value for the red channel can be tracked 918 over a minimum period of time, such as at least one cycle of a typical human pulse. The changes in chroma value tracked over time and can be analyzed to determine whether there are changes that correspond in time and variation to an actual human face. As described, in at least some embodiments, a device might utilize stereo cameras or a distance sensor, or other such element(s) to attempt to detect distance information or disparity information as well, which can be used to generate at least a basic three-dimensional model of the determined facial region. The three-dimensional (3D) data can be used to verify that the region corresponds generally to the shape of a human head, and not a flat screen or image. The changes in chroma value and the 3D data can be used to generate 920 the verification signature representative of the user. The signature can be tracked over time and can be used to determine whether the verification signature corresponds to that of an actual human. If the signature is determined 922 to not correspond to a human face with at least a minimum level of certainty, confidence, or other such measure, the person can be denied access 926. If, however, the signature is determined to correspond to an actual human user, and the facial features match an authorized user, the person can be granted access 928 to the data, functionality, or other information on the computing device.

In various embodiments, the user can be granted one or more different levels of access (and in other situations denied at least one level of functionality or access) to the device based at least in part on the verification signature. For example, one or more algorithms can be used by the device to analyze the image or video information to generate the verification signature or fingerprint indicative of a physical person being within a detectable range of the computing device. As described, the verification signature be can a model of features or cues associated with an authorized user of the device, such as a shape of the face, a stereo disparity signature of the face, color or image brightness, facial feature (e.g., mouth, eyes, head, ect.) movement, among others. A current cue (e.g., a stereo disparity signature) indicative of the current user's face can be compared to a corresponding model cue, and the result along with other comparisons using other features or cues (if available) can be used in the determination of whether the user currently utilizing the device is an actual person. For example, based at least in part on the cues used in the set of cues, the user can be provided access to at least a portion of the functionality and/or granted a level of access. For example, at least one of the one or more of the cues (e.g., disparity signature, a determination of a human pulse) can be compared to a model associated with an authorized user of the device to generate a confidence value (or other score) indicative of whether the current user operating the device is likely the owner of the device. The confidence value can be compared to at least one confidence threshold, for example, and based on the comparison, the current user can be provided access to at least a portion of functionality of the device and/or a security action (such as disabling the device, sending an email to the owner of the device, calling another phone number, requiring the current user to enter a passcode, among others) can be performed when the confidence value does not at least meet at least one confidence threshold. In at least some embodiments, the type of access granted and/or security action performed can correspond to the determined confidence value and/or the confidence thresholds that were, or were not, met. For example, a confidence value meeting a highest threshold might be granted full access with no security action taken, while a confidence value meeting a lower threshold might have some access granted with a type of security action taken, while a confidence value not meeting any of these thresholds might result in a user being locked out of a device or another such action taken.

In certain embodiments, if the user is denied access, the user can be prompted to provide additional information in order to be authenticated into the device. For example, the user can be prompted pose for a picture from a different angle or a picture taken under better lighting conditions. Additionally or alternatively, the user can be prompted to perform an authentication gesture or other biometric data such as voice. Further, the user can be prompted to enter a pin code, provide user specific identification information, or respond to some other authentication method. For example, the other authentication methods can require a person to answer a secrete question, perform a gesture, provide biometric data, or provide some other input, data, or action in addition to (or instead of) the pin code in order to authenticate into the device.

In some embodiments, a person could attempt to spoof such a process by flashing a red light on a photo of a user held up, or otherwise positioned, in front of a camera of a computing device. It can be difficult, however, to provide an amount of light that causes a realistic change of an appropriate value using a conventional photograph or image. Similarly, a video display of a person's face can have distortions due to differences in frame rate or timing that can make it difficult to spoof both the facial recognition and pulse detection processes.

In some embodiments, a pulse detection process can utilize other portions of the user, such as a hand, arm, or shoulder. In many cases, however, the face will be more likely to be exposed and within the field of view of at least one camera. Further, the face can be less likely to move significantly than a human hand unless the user has to hold the hand still in front of the camera, which can potentially degrade the user experience.

Various other techniques can be used to attempt to verify an actual human user as well. For example, the video information can be analyzed to detect the presence of one or more blinks of the eyes of the user over a period of time. If no blink is detected after a maximum period of delay, such as 45 seconds to a minute, it can be determined that the image information does not correspond to a human user. In some embodiments, a light can be flashed when a confidence level cannot be reached and the image information can be analyzed to see if the pupils contract as would those of a human user. Again, however, such an approach might not be optimal from a user experience standpoint. In such a situation, one or more images can be analyzed to determine any eye movement (e.g., strabismus or other eye movement) to determine that the image information corresponds to a physical person. In some embodiments, the device could prompt the user to perform an action, such as to smile or rotate his or her head, which can be difficult to replicate with a photo or stored video file. In some embodiments, the device can show a funny or startling image or other such information, for example, and determine whether the user reacts to the image, although reactions can vary significantly between different users. In some embodiments, an infrared emitter and detector pair can be used to attempt to determine aspects such as pulse and pupil reflection, which also can be indicative of a human user. It can be desirable to utilize such approaches as additional sources of information when results cannot be determined within an acceptable level of confidence, as may be due to a number of factors such as an amount or type of ambient light, variations in skin tone, amount of makeup applied, body temperature, resolution of the camera, and other such factors.

In some embodiments, a heartbeat can be considered to be on the order of about one beat per second. If a video camera captures information at a rate of at least 15-30 frames per second, as is typical for even low quality conventional video cameras, the number of data points will be more than adequate to determine variations due to heart rate. Further, a couple seconds of video should be sufficient to capture at least two full cycles of information, which can be sufficient to determine rate in addition to amount of variation. The frequency at which the red colors change can be used to determine the use's approximate heartbeat, and the frequency must be within a determined range of potential heart beats in order for the user to be authenticated as an actual person.

In at least some embodiments, the captured video does not need to be buffered any longer than is needed for color analysis. For example, a chroma triplet (e.g., R, G, B) of values can be determined for the region of interest in each frame, and that information stored for subsequent analysis, such as may use the plotting of FIG. 8. Such an approach can result in a relatively small data set to be analyzed after the determined period of time for monitoring pulse. Further, as long as a facial region can be determined with a reasonable degree of certainty, the video camera can operate in a relatively low resolution mode, as only enough information is needed to detect a change in color values over time.

In addition to processes discussed herein, other approaches to utilizing photoplethysmography (PPG) can be used to detect a cardiovascular blood volume pulse through changes in the light reflected (or transmitted) from a person's skin. Pulse measurements can be made using images of the human face illuminated with ambient light, or another such source. The detected light can be analyzed along any appropriate channels using any appropriate color sensors, such as may include red, blue, and green among others. The observed weights of the color information from each channel can be measured over time to determine changes due to the facial blood vessels over the cardiac cycle. In some embodiments the color values can be spatially averaged over all pixel values in the analyzed region. One or more filters can be used to process the color signals as well as known for such purposes. In one embodiment, the red channel is ratioed with the blue and/or green channels (R/(B+G), R/B, or R/G) so that the signal analyzed for pulse detection is normalized for ambient light conditions even if ambient light conditions are changing and the modulation of the signal is maximized In another embodiment, the red channel is ratioed with the luminance of the signal R/L where luminance is understood in the art to the brightness of the image independent of color information and is equivalent to R/(R+G+B). Said luminance value is often generally available and this ratio R/L may be slightly easier to obtain than the aforementioned R/(G+B) and will suffer only slightly less modulation strength but may provide a better normalization against difficult ambient lighting situations. All of these methods whereby the red component is measured relative to the other components or to the overall brightness will be referred to as normalized red chroma.

Figure 10:
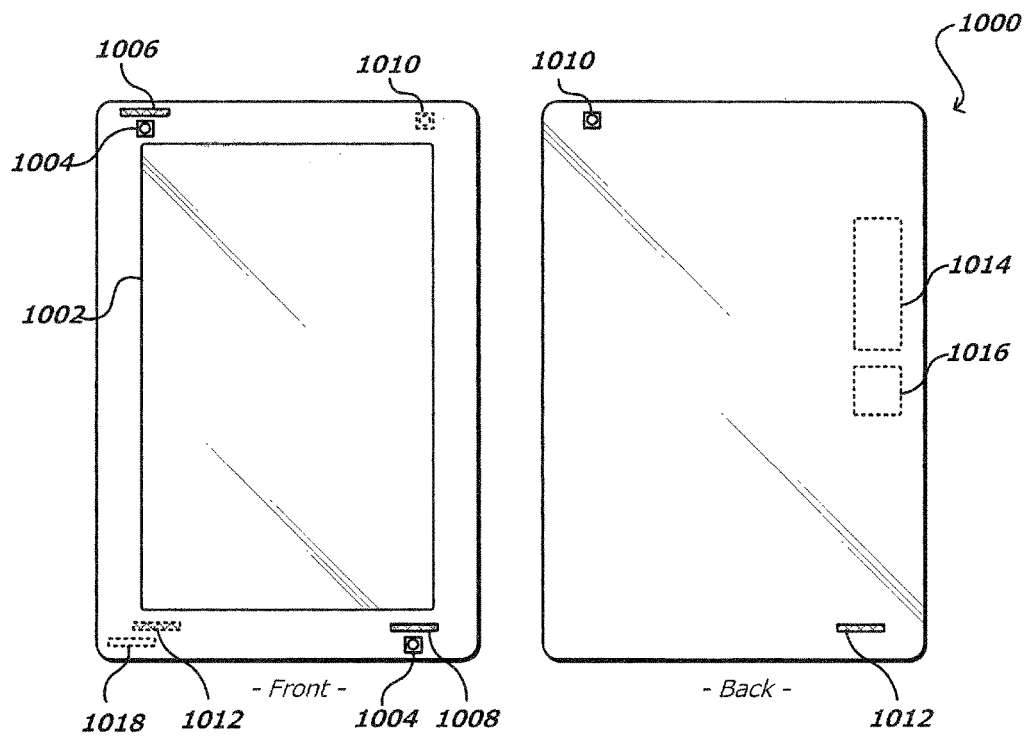
FIG. 10 illustrates an example device that can be used in accordance with various embodiments.

FIG. 10 illustrates front and back views of an example electronic computing device 1000 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1000 has a display screen 1002 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1004 on the front of the device and at least one image capture element 1010 on the back of the device. It should be understood, however, that image capture elements could also, or alternatively, be placed on the sides or corners of the device, and that there can be any appropriate number of capture elements of similar or different types. Each image capture element 1004 and 1010 may be, for example, a camera, a charge-coupled component (CCD), a motion detection sensor or an infrared sensor, or other image capturing technology.

As discussed, the device can use the images (e.g., still or video) captured from the imaging elements 1004 and 1010 to generate a three-dimensional simulation of the surrounding environment (e.g., a virtual reality of the surrounding environment for display on the display element of the device). Further, the device can utilize outputs from at least one of the image capture elements 1004 and 1010 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1008 on the front side, one microphone 1012 on the back, and one microphone 1006 on or near a top or side of the device. In some devices there may be only one microphone, while in other devices there might be at least one microphone on each side and/or corner of the device, or in other appropriate locations.

The device 1000 in this example also includes one or more orientation- or position-determining elements 1018 operable to provide information such as a position, direction, motion, or orientation of the device. These elements can include, for example, accelerometers, inertial sensors, electronic gyroscopes, and electronic compasses.

The example device also includes at least one communication mechanism 1014, such as may include at least one wired or wireless component operable to communicate with one or more electronic devices. The device also includes a power system 1016, such as may include a battery operable to be recharged through conventional plug-in approaches, or through other approaches such as capacitive charging through proximity with a power mat or other such component. Various other elements and/or combinations are possible as well within the scope of various embodiments.

Figure 11:
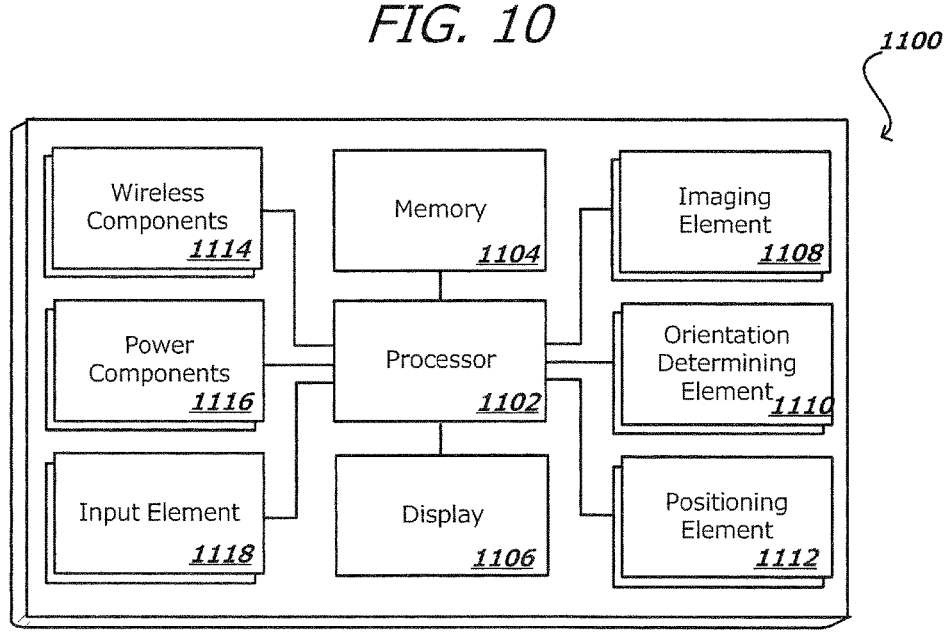
FIG. 11 illustrates an example set of components that can be utilized in a device such as that illustrated in FIG. 10.

FIG. 11 illustrates a set of basic components of an electronic computing device 1000 such as the device 1100 described with respect to FIG. 10. In this example, the device includes at least one processing unit 1102 for executing instructions that can be stored in a memory component or element 1104. As would be apparent to one of ordinary skill in the art, the device can include many types of memory, data storage, or computer-readable media, such as a first data storage for program instructions for execution by the processing unit(s) 1102, the same or separate storage can be used for images or data, a removable memory can be available for sharing information with other devices, and any number of communication approaches can be available for sharing with other devices.

The device typically will include some type of display element 1106, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1108, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1100 also includes at least one orientation determining element 1110 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1100. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1112 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1114 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1116, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input component 1118 able to receive conventional input from a user. This conventional input can include, for example, a push button, touch pad, touch screen, wheel, joystick, keyboard, mouse, keypad, or any other such component or element whereby a user can input a command to the device. These I/O components could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 12:
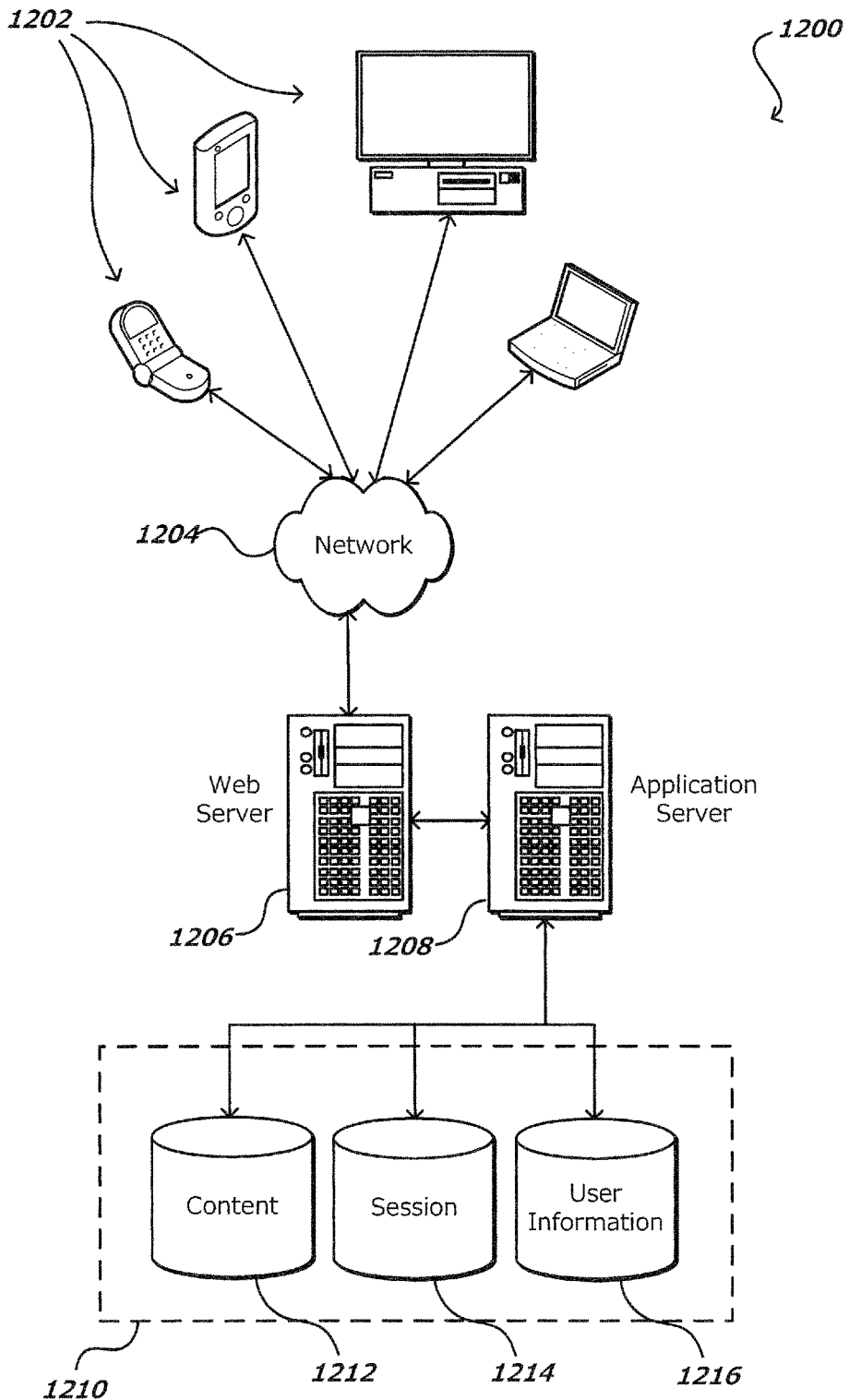
FIG. 12 illustrates an example an environment in which various embodiments can be implemented.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes electronic client devices 1218, 1220, 1222, and 1224, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" ' network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any component or combination of components capable of storing, accessing and retrieving data, which may include any combination and number of data servers, databases, data storage components and data storage media, in any standard, distributed or clustered environment. The application server 1208 can include any appropriate hardware and software for integrating with the data store 1210 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1206 in the form of HTML, XML or another appropriate structured language in this example. The handling of all requests and responses, as well as the delivery of content between the client devices 1218, 1220, 1222, and 1224 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1218, 1220, 1222 and 1224. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized components, each such component can include hardware elements that may be electrically coupled via a bus, the elements including, for example, at least one central processing unit (CPU), at least one input component (e.g., a mouse, keyboard, controller, touch-sensitive display element or keypad) and at least one output component (e.g., a display component, printer or speaker). Such a system may also include one or more storage components, such as disk drives, optical storage components and solid-state storage components such as random access memory (RAM) or read-only memory (ROM), as well as removable media components, memory cards, flash cards, etc.

Such devices can also include a computer-readable storage media reader, a communications component (e.g., a modem, a network card (wireless or wired), an infrared communication component) and working memory as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a first camera having a first field of view;
   a second camera separated by a distance from the first camera, the second camera having a second field of view that at least partially overlaps the first field of view; and
   memory including instructions that, when executed by the computing device, cause the computing device to:
      acquire a first image by the first camera;
      acquire a second image by the second camera, the first image and the second image being captured over a period of time;
      analyze the first image to locate a first representation of a head portion;
      analyze the second image to locate a second representation corresponding to the head portion in the second image;
      determine, from the first representation and the second representation, at least one of depth or distance information associated with one or more facial features of the head portion;
      determine the at least one of depth or distance information corresponds to a physical person within a detectable range of the computing device, and not a representation of the physical person;
      detect changes in a red chroma color component of the head portion relative to at least one other chroma color component or luminance value over the period of time;
      determine the changes correspond to a signature representative of the physical person, and not a representation of the physical person; and
      authenticate the head portion as being that of the physical person in response to determining the at least one of depth or distance information corresponds to the physical person and the red chroma color component relative to the at least one other chroma color component or luminance value corresponds to the signature representative of the physical person.

2. The computing device of claim 1, wherein the signature is representative of the physical person when the changes vary with a frequency and amplitude of red chroma color changes consistent with a living human face or an amount of disparity is determined to be below a predetermined threshold, wherein changes in the red chroma color component correspond to changes in coloration of the head portion due to periodic blood flow through human skin, the periodic blood flow corresponding to a human pulse.

3. The computing device of claim 1, wherein the instructions further cause the computing device to:
   analyze the first representation and the second representation using a facial recognition algorithm to determine at least one facial feature contained in both the first representation and the second representation;
   compare the at least one facial feature to one or more facial features of previously authenticated faces; and
   identify one of the previously authenticated faces that matches the head portion.

4. The computing device of claim 1, wherein the instructions causing the computing device to determine the at least one of depth or distance information further cause the computing device to:
   determine a first location of a first feature point in the first image corresponding to at least one facial feature represented in the first representation;
   determine a second location of a second feature point in the second image corresponding to the at least one facial feature represented in the second representation; and
   determine an amount of offset between the first location and the second location along at least one axis.

5. A computer-implemented method, comprising:
   acquiring, by cameras of a computing device having at least partially overlapping fields of view, a set of images including a representation of a face, the set of images comprising a first image and a second image;

determining at least one of depth or distance information of one or more features of the face represented in the first image and the second image;

determining the at least one of depth or distance information corresponds to a physical person within a detectable range of the computing device, and not a representation of the physical person;

determining, in at least a subset of the set of images, a change in a red chroma color component of the face relative to at least one other chroma color component or luminance value over a period of time;

determining the change corresponds to a signature of the physical person, and not a representation of the physical person; and authenticating the face as being that of the physical person, and not a representation of the face, in response to determining the at least one of depth or distance information corresponds to the physical person and the change corresponds to the signature of the physical person.

6. The computer-implemented method of claim 5, wherein determining the at least one of depth or distance information includes:

locating a first representation of the face in the first image;

locating a second representation of the face in the second image;

analyzing the first representation and the second representation using a facial recognition algorithm to determine a facial feature represented in both the first representation and the second representation;

determining a first location of one or more feature points corresponding to the facial feature represented in the first representation;

determining a second location of the one or more feature points in the second representation; and determining an amount of offset between the first location and the second location along at least one axis.

7. The computer-implemented method of claim 5, further comprising:

locating a first representation of the face in the first image;

analyzing the first representation using a facial recognition algorithm;

determining, in response to analyzing the first representation, a facial feature represented in the first representation identifying a previously authenticated face that matches the first representation.

8. The computer-implemented method of claim 5, further comprising:

generating a three-dimensional (3D) model of the representation based at least in part upon the set of images, wherein generating the 3D model utilizes at least in part determining one or more depths of one or more features on the face; and identifying a previously authenticated face model that matches the 3D model.

9. The computer-implemented method of claim of claim 5, wherein the signature includes at least one of a movement of at least one facial feature, a movement of a head, or a representation of a retina.

10. The computer-implemented method of claim 5, wherein the period of time encompasses a plurality of human heartbeat cycles.

11. The computer-implemented method of claim 5, wherein the signature represents that of the physical person when the change includes a frequency and amplitude corresponding to a change in coloration of the face due to periodic blood flow through human skin, the periodic blood flow corresponding to a human pulse.

12. The computer-implemented method of claim 5, wherein determining the change comprises:

determining at least a normalized red chroma color component varies with a frequency and amplitude consistent with a living human face.

13. The computer-implemented method of claim 5, further comprising:

granting access to functionality on the computing device in response to authenticating the face; and denying access to at least one level of functionality on the computing device in response to being unable to authenticate the face.

14. The computer-implemented method of claim 6, further comprising:

detecting, in at least a portion of the set of images, at least one of blinking, a making of an expression, or a moving of a head; and including information indicative of the at least one of the blinking, the making of the expression, or the moving of the head in the signature.

15. The computer-implemented method of claim 5, further comprising:

locating a representation of a head in at least one captured image frame before analyzing one of the first set of images.

16. A non-transitory computer readable storage medium storing one or more sequences of instructions executable by one or more processors to perform a set of operations comprising:

acquiring a first set of images and a second set of images that include at least a representation of a face, the first set of images captured using a first camera and the second set of images captured using a second camera of a computing device, wherein the first camera and the second camera have partially overlapping fields of view;

determining at least one of depth or distance information for each of a plurality of corresponding features of the face in the first set of images and the second set of images;

determining the at least one of depth or distance information corresponds to a physical person within a detectable range of the computing device, and not a representation of the person;

determining, in at least a subset of the first set of images and the second set of images, changes in a red chroma color component of the face relative to at least one other chroma color component or luminance value over a determined period of time;

determining the changes correspond to a signature of the physical person, and not a representation of the physical person; and authenticating the face as being that of the physical person, and not a representation of the face of the physical person, when the at least one of depth or distance information corresponds to the physical person and the changes correspond to the signature of the physical person.

17. The non-transitory computer readable medium of claim 16, further comprising instructions executed by the one or more processors to perform the operations of:

processing at least one image of the first set of images or the second set of images using a facial recognition algorithm; and determining the representation of the face corresponds to that of an authorized user in response to matching information for the authorized user within at least a minimum level of confidence.

18. The non-transitory computer readable medium of claim 16, further comprising instructions executed by the one or more processors to perform the operations of:

flashing an illumination element of the computing device; and analyzing, in response to the flashing, a reaction of a pupil of the representation of the face in at least one captured image of the first set of images or the second set of images.

19. The non-transitory computer readable medium of claim 16, further comprising instructions executed by the one or more processors to perform the operations of:

prompting performance of an action with a head in response to determining that the face is unable to be authenticated with at least a minimum level of confidence, at least the first set of images being monitored to detect performance of the action.

* * * * *